United States Patent [19]
Anderson et al.

[11] Patent Number: 5,987,458
[45] Date of Patent: Nov. 16, 1999

[54] AUTOMATED CABLE SCHEMATIC GENERATION

[75] Inventors: Kenneth George Anderson, Vestal; Mark Herbert Olson, Endicott; Allen Irvin Wright, Owego, all of N.Y.

[73] Assignee: Lockheed Martin Corporation, Bethesda, Md.

[21] Appl. No.: 08/721,416

[22] Filed: Sep. 26, 1996

[51] Int. Cl.[6] .................................................. G06F 17/00
[52] U.S. Cl. .................. 707/6; 707/2; 707/7; 707/9; 707/10; 707/101; 707/102; 707/103
[58] Field of Search ................................ 707/1–10, 104, 707/200–206; 705/10

[56] References Cited

U.S. PATENT DOCUMENTS

| | | | |
|---|---|---|---|
| 5,021,968 | 6/1991 | Ferketic | 364/505 |
| 5,038,294 | 8/1991 | Arakawa et al. | 364/491 |
| 5,164,908 | 11/1992 | Igarashi | 364/491 |
| 5,621,884 | 4/1997 | Beshears et al. | 395/182.08 |
| 5,651,012 | 7/1997 | Jones, Jr. | 371/22.1 |
| 5,668,745 | 9/1997 | Day | 364/580 |
| 5,671,150 | 9/1997 | Maxwell | 364/488 |
| 5,680,470 | 10/1997 | Moussa et al. | 382/119 |
| 5,684,710 | 11/1997 | Ehlers et al. | 364/492 |

*Primary Examiner*—Thomas G. Black
*Assistant Examiner*—David Yiak Jung
*Attorney, Agent, or Firm*—Whitham, Curtis & Whitman; William H. Steinberg

[57] ABSTRACT

Input data is partitioned and organized by building a sequence of predefined data structures corresponding to respective data models, each having a different organization and including pointers for propagating input data or data from a preceding data structure therethrough. Each data structure also includes fields for data values which may be input by a user or computed from other data stored therein and pointers referencing instances in a previous data structure in the sequence of data structures. As applied to the production of schematic drawings of cables connecting portions of a large and complex system with a high uniformity of style, such as to ANSI standards, the data is organized by unit, connector and pin priority and in prioritized groups of nets or subnets and partitioned into sheets for rendering in a standardized format. The pointers to instances of data in previous data structures facilitates collection of data for the production of other types of drawings at differing degrees of abstraction, producing reports referenced to drawing content and the like.

28 Claims, 17 Drawing Sheets

AUTOMATED CABLE SCHEMATIC GENERATION

STATEMENT OF GOVERNMENT INTEREST

This invention was made with Government support under N00019-93-C-0196 awarded by the Department of the Navy. The Government has certain rights in this invention.

BACKGROUND OF THE INVENTION

1. Field of the Invention

The present invention generally relates to the design and documentation of complex electronically interconnected systems and, more particularly, to automation of the drawing of schematic diagrams depicting interconnections of elements of the system through wiring, busses and cables and production of other diagrams and documentation correlated to such drawings.

2. Description of the Prior Art

Increasing computational and data processing power of modern digital circuits has allowed the design and fabrication of systems and devices of extremely high performance which were impossible only a few years ago due to the impracticality of exploiting that potential performance. For example, the performance of aircraft has been greatly increased by exploitation of instabilities which could not previously be controlled by a human pilot but can be managed by the ability of modern data processors to rapidly collect and assimilate large amounts of information from various types of sensors and to manipulate portions of the aircraft to achieve control functions consistent with control commands manually input by the pilot. Thus the pilot can control the aircraft in the same manner as controlling an aircraft not subject to such instabilities while largely unaware of the actual manipulations of the portions of the aircraft. Such complex systems for aircraft control and other purposes are broadly referred to as avionics. As another example, the integration of sub-systems to improve and coordinate overall function, such as in environmental and operational controls of a large vehicle, building, assembly line, manufacturing plant, multi-site network or the like, may result in a system too complex to be managed or maintained by a sufficiently small number of people to be operationally or economically feasible. Nevertheless, such complex systems may be managed by suitable control processors and often more efficiently and effectively than a large number of human operators.

The design of complex systems and devices also imposes physical constraints on the overall design. For example, particularly in avionics applications, the system will be comprised of many functional units distributed throughout the aircraft as dictated by space, weight and other design constraints. Such distribution of the complex system requires numerous cables and/or wiring yokes containing a few to several thousand individual connections or more used to connect the functional units. Formation of connections by cables and wiring yokes is often necessary in vehicles such as automobiles or aircraft which are subject to vibration since the mutual support of the connections and the further support and protection of cabling structures significantly reduces the potential for damage to individual connections and increases reliability.

Cables must often be designed for specific applications and interconnections to be made since, for example, unused connections should generally be avoided to reduce weight, capacitive or inductive coupling and the like. The signals or power carried by the connections must also be considered in such designs to specify the types of connections made such as wire gauge, twisted pair or group wiring, ribbon cable, order of connector pins at cable terminations, shielding and the like. Compatibility of connectors and pin assignments therein must often be coordinated between numerous suppliers and consistency must be maintained.

While software is known which can automate specification of point-to-point connectivity in complex system designs, at the present state of the art, design of cabling must be done manually. Specifically, even using computer assisted design (CAD) arrangements to produce graphic representations of the cable designs, time-consuming manual transposition of point-to-point connectivity data was required and resulted in inconsistencies of design style in the finished product when numerous draftsmen work on particular ones of the numerous sheets of drawings generally required.

Such manual intervention is understandably error-prone and prevents automated error detection or automated design revision to implement changes which may be necessitated by other manually input changes to the design. Likewise, logging of design changes becomes difficult since the documentation is, at best, in the form of full drawings and particular changes are not specifically identified. Further, for the same reason, the form of data resulting from the CAD operation is not in a form from which manufacturing data, such as parts lists, cable lengths, connector types and the like can be extracted other than manually. The time required for revisions necessitated by design changes and error correction also delays and complicates system testing and integration since changes in system connectivity require extended turn-around time for inclusion in drawings and other documentation.

These difficulties remain even after the system or device is produced since schematic diagrams must be provided to permit repair and maintenance of the system or device. Block diagrams at various levels of abstraction, such as assembly drawings and illustration of system operational hierarchy or architecture as well as indices for service or assembly manuals are generally prepared manually from the schematic diagrams for reference documentation of the system and the intervention by data entry personnel is again error-prone and may obscure the hierarchical architecture or the configuration control properties of the system.

In connections with these concerns described above, drawings of large and complex systems must be partitioned in order to develop legible renderings on each of perhaps a very large number of sheets. At the same time, for reference of systems integrators and maintenance and repair personnel, this partitioning must also allow rapid assimilation and congruence with physical layout of the system and thus must embody a logical grouping on each sheet. Such a logical grouping consistent with practical limitations on graphical content is very difficult to organize, particularly for manual rendering or manual transposition for CAD rendering. At the same time, development of indices or other listings in accordance with drawing content becomes exceptionally difficult to track as systems become large and the number of sheets of drawings increases.

This difficulty can be readily understood since CAD files, for example, are developed with reference to a drawing sheet and do not provide for tracking of content, as alluded to above. Likewise, from the standpoint of connectivity information, there has been no mechanism or methodology for systematically approaching layout of a schematic depiction on a page or addressing the issue of accommodating operational function and/or logical grouping during drawing layout. As complex systems become large, these issues become more complex than can be comprehensively organized by the number of people required to transpose connectivity data to CAD files and the likelihood of errors and, particularly, omissions, is dramatically increased.

SUMMARY OF THE INVENTION

It is therefore an object of the present invention to provide a tool for design of detailed wiring, particularly for cabled systems, and automation of the production of wiring and cabling schematic diagrams for cabling designs.

It is another object of the invention to provide an automated arrangement for design of cabling from point-to-point connectivity data which can maintain data in a form from which other data such as manufacturing data may be extracted.

It is a further object of the invention to provide automation of schematic diagram production such that changes may be implemented in multi-page drawings in a short period of time.

It is yet another object of the invention to provide for automated production of system drawings at differing levels of detail or abstraction.

It is a yet further object of the invention to provide an arrangement for the production of schematic drawings in which design changes may be readily tracked and documented.

It is another further object of the invention to provide for logical partitioning of depictions of large and complex systems in accordance with physical arrangement and operational function which are also consistent with practical limitations on content.

In order to accomplish these and other objects of the invention, a method of organizing and partitioning a large body of data is provided including the steps of inputting a body of data, building a first data structure in accordance with a first data model including the body of data and data derived by processing the body of data, building a second data structure in accordance with a second data model including data from the first data structure and data derived by processing data from the first data structure in accordance with pointers from fields of said first data structure to the second data structure, wherein fields of the second data structure include pointers to instances of data included in the first data structure.

In accordance with another aspect of the invention, a method of preparing schematic drawings of electrical connections between units of a physical system is provided, including the steps of inputting a group of connectivity data, interfacing the group of connectivity data to storage of collected connectivity data, building a first data structure in accordance with a first data model including collected connectivity data and data derived by processing collected connectivity data, building a second data structure in accordance with a second data model including data from the firstt data structure and data derived by processing data from the first data structure in accordance with pointers from fields of said first data structure to entries in said second data structure, wherein fields of said second data structure include pointers to instances of data included in said first data structure.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
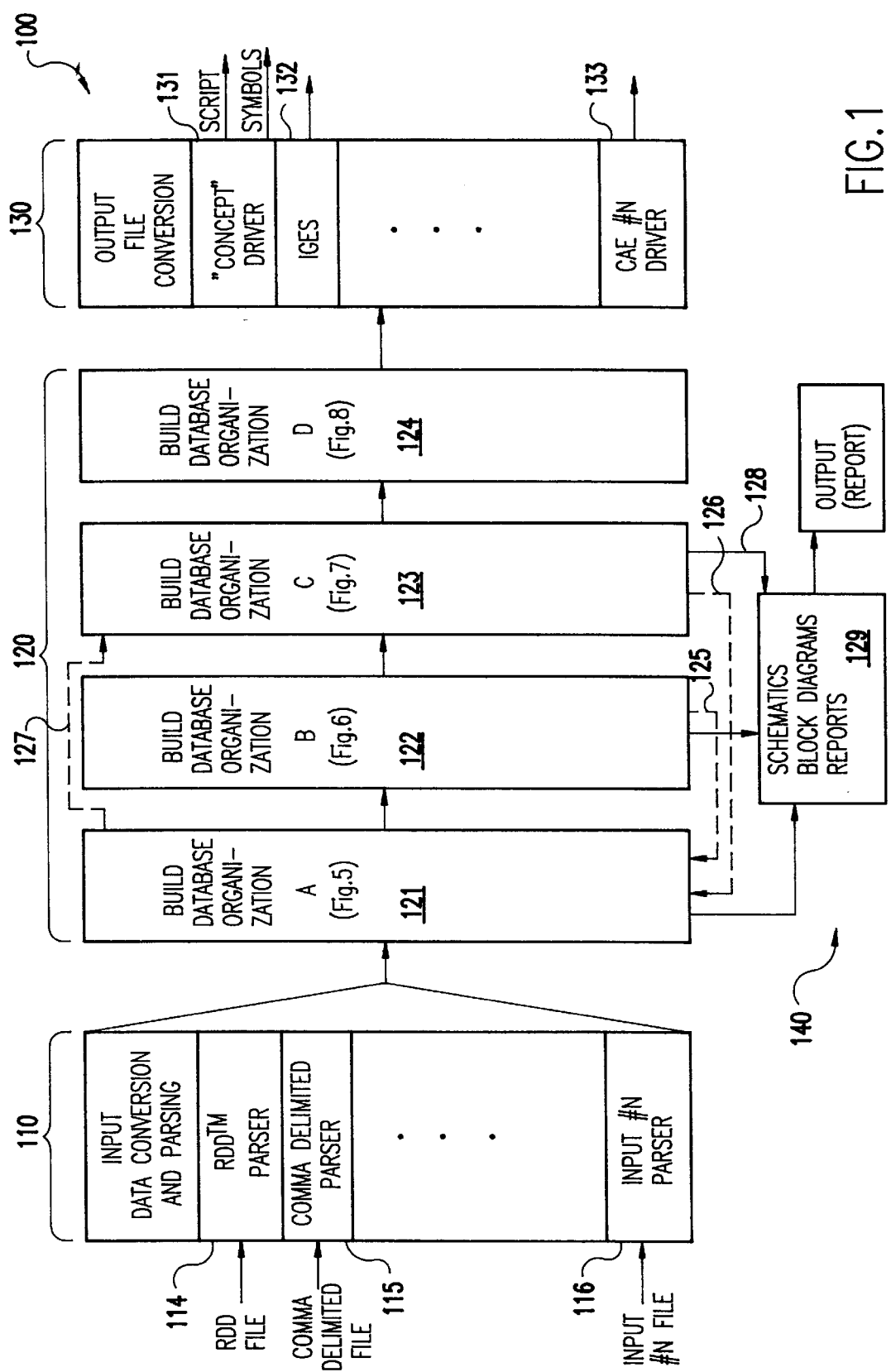
FIG. 1 is a high level block diagram of the architecture of a preferred form of the invention.

Referring now to the drawings, and more particularly to FIG. 1, there is shown a high level block diagram of the overall organization of a system 100 in accordance with the present invention. The system 100 can principally be considered to comprise three basic sections: an input section 110 for input conversion and data collection, a processing section 120 for assembling a sequence of databases or database collections or hierarchies and an output section 130 for output file conversion and output device drivers. As a perfecting feature of the invention, a further reports section 140 is preferably provided for generating reports and analyses of information contained in schematic drawings and other depictions as developed by the invention.

More specifically, since the system is generally required to accept data from a plurality of suppliers, input and data collection section 110 preferably includes a plurality of data conversion and buffering elements. Suppliers and/or users will often use commercially available applications such as RDD-100 (Requirements Driven Development) by Ascent Logic Corporation, 180 Rose Orchard Way - Suite 200, San Jose, Calif. 95134 or applications which present output data in comma delimited fields and parsers 114, 115, respectively, are preferably provided to accommodate such inputs. Any other types of parsers in any number, as may be needed to allow acceptably generic usage of the invention, are preferably included as indicated by Input #N parser 116.

The processing portion 120 of the system in accordance with the invention includes a series of predefined but sequentially built database structures 121–124, each having a distinct hierarchical structure and embodying a distinct data model. It is currently preferred that these data structures are embodied in "C" language system calls (e.g. to obtain and configure additional memory space) which define data structures and pointers to define each of a plurality of data models rather than a formalized flat or relational database structure. Therefore, the depictions of the hierarchies of the respective data models of FIGS. 5–8 may also be regarded as a schematic depiction of the hardware which is thus configured, including selective data access paths.

However, well-known and understood database organizations could also be used. In particular, relational databases of the entity-attribute-relationship type are presently quite familiar to those skilled in the data processing art and are conceptually quite similar to the preferred embodiment of the invention although some manipulations which will be described below may be less convenient than as expressed in the C language. Accordingly, to facilitate an understanding of the invention, the term database and data structure will be used substantially synonymously hereinafter. Similarly, an entity is an instance of a data entry in the database or data structure and a list of information, preferably in tabular form, corresponding to that instance corresponds to attributes of the entity. Pointers correspond to relationships.

However, it should be clearly understood that the database or data structure which may be used to embody a particular data model is dictated by the type of system which is to be designed and the particular way that it is desired to partition and organize data in regard to the desired intermediate and ultimate function of the system. Therefore, the actual data structure of each database hierarchy with regard to which the invention will be described is not critical to the practice of the invention. Thus FIGS. 5–9 should be considered as exemplary of a preferred embodiment and application of the invention and the details thereof not critical to its practice. It is only necessary that the data structure or database be defined in accordance with the data model so that the particular databases or data structures in accordance with the invention can be built.

The database structures 121–124 may thus be considered to exist as a plurality of entity tables, whether defined in C, a relational database or in some other manner. Each entity table has an entry corresponding to an instance of the entity and includes fields for containing attributes as internal information specific to the instance, and relationships as pointers to other entities in the database. Relationships or pointers may be and preferably are specific to particular attributes or fields of an instance or entity. It should also be understood that each entity table could be considered as and take the form of a database itself and the database organization could be considered as a hierarchical collection of such databases but which still may be properly referred to as a database or database structure. It should also be understood that, in the preferred embodiment of the invention established by system calls in the "C" language, the distinction in function and/or implementation between relationships and attributes is relatively less important or, for that matter, distinct.

The overall process of the invention comprises the mapping one database structure onto another database structure or otherwise building each of databases A–D, 121–124, in turn. The specifics of the methodology of the invention is largely implicit in the relationship between the respective database structures and information generated by operations on each database preparatory to mapping information in each database structure into (or building) the next database structure. The organization of each database structure is, in turn, defined by the provision or definition (e.g. configuration) of tables and entries and fields thereof within each table and the pointers from fields of an entity to other tables and entries therein. It is also conceptually important to the understanding, the practice and the derivation of the meritorious effects of the invention that such pointers in fields within tables of a database structure are not confined to the same database structure or data model but may include pointers to earlier database structures, as indicated at 125 and 126. More than one database can supply data for building of another, as shown at 127 although, generally, each consecutive data structure will contain less of the originally input data, by virtue of the ability to reference earlier data structures by pointers 125 and 126 but will contain additional data derived therefrom (e.g. by computation) which is more specific to the graphic depictions or other function of the overall system 100.

Finally, output section 130 is similar to input section 110 since it is essentially a collection of drivers for other output arrangements such as particular computer assisted engineering (CAE) tools in either software or hardware or a combination thereof. For example, a preferred output arrangement is a known and commercially available schematics capture tool called "Concept", available from Cadence Design Systems, Inc. Corporate Headquarters, 555 River Oaks Parkway, San Jose, Calif. 95134. A driver for this tool is preferably included and is indicated at 131 of FIG. 1. Similarly, a generalized output standard is known as the International Graphics Exchange Specification (IGES) and an appropriate converter/driver is shown at 132. Generic or specific display or printer drivers are convenient for use and preferably included, as well, as indicated at 133.

It should be understood that none of the specifics of any of the data conversion/collection arrangements of input section 110 or the specifics of any of the output drivers of output section 130 is, in any way, critical to the practice of the invention and the development of suitable arrangements for either will be evident to those skilled in the art. It is only important to provide arrangements which will accommodate input data and properly interface with desired output devices in order to be generically applicable thereto. Alternatively, although not preferably, one or more output devices could be arranged to accept data directly from database organization 124 of FIG. 8 in the form and format in which the data exists therein.

Figure 2:
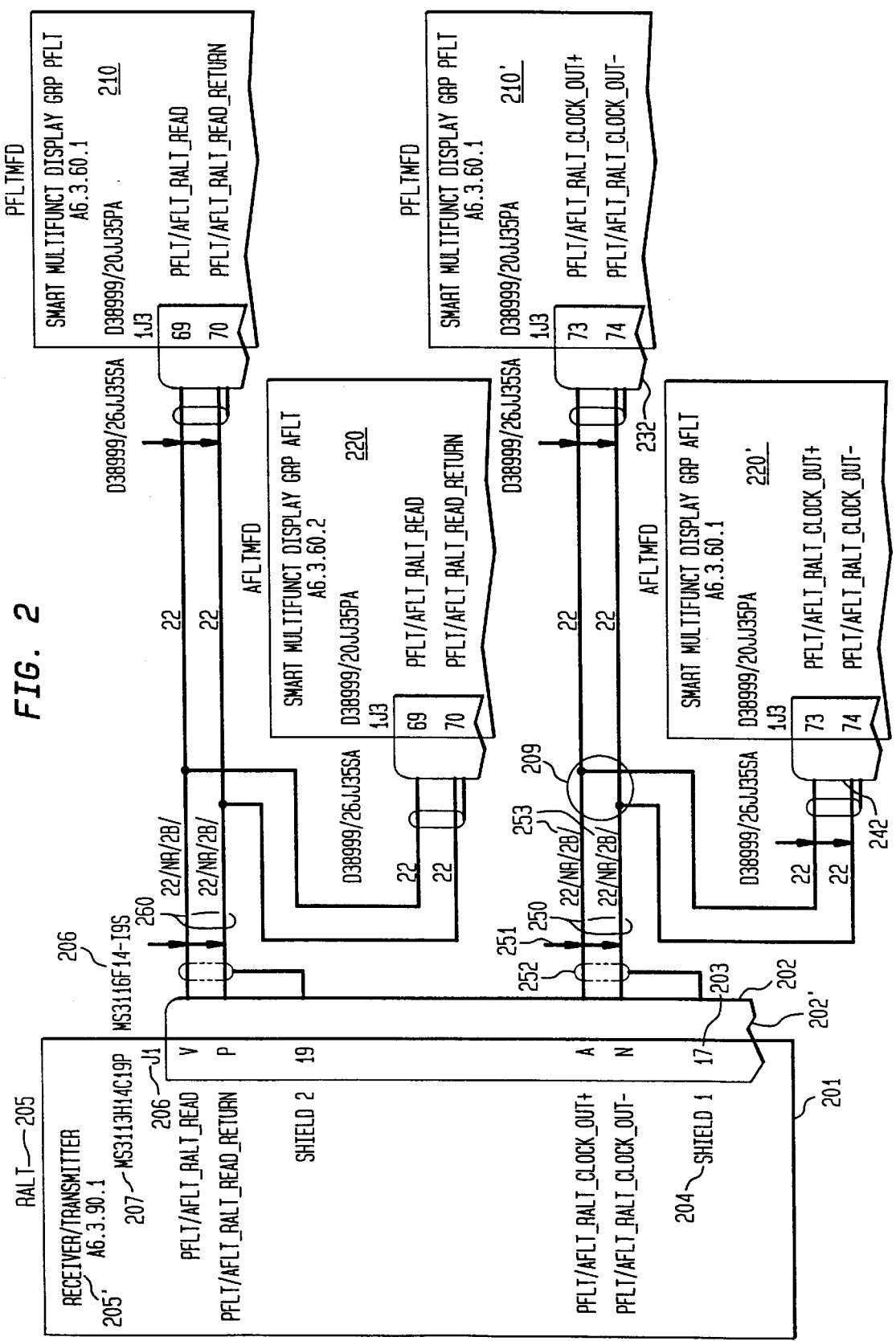
FIGS. 2 and 3A, 3B, 3C, 3D and 3E are representations of schematic diagrams as may be produced by the invention.
Figure 3A:
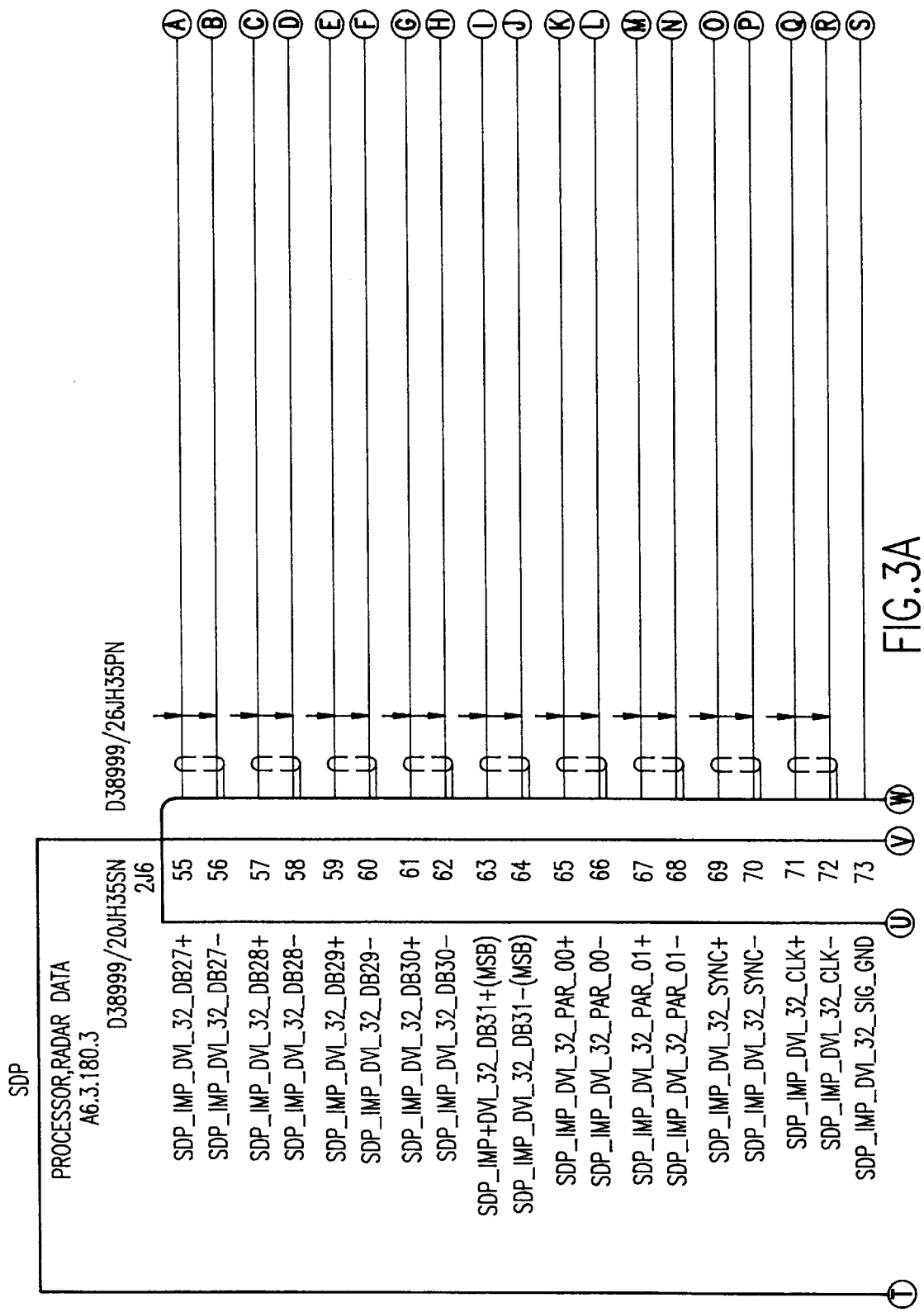
Figure 3B:
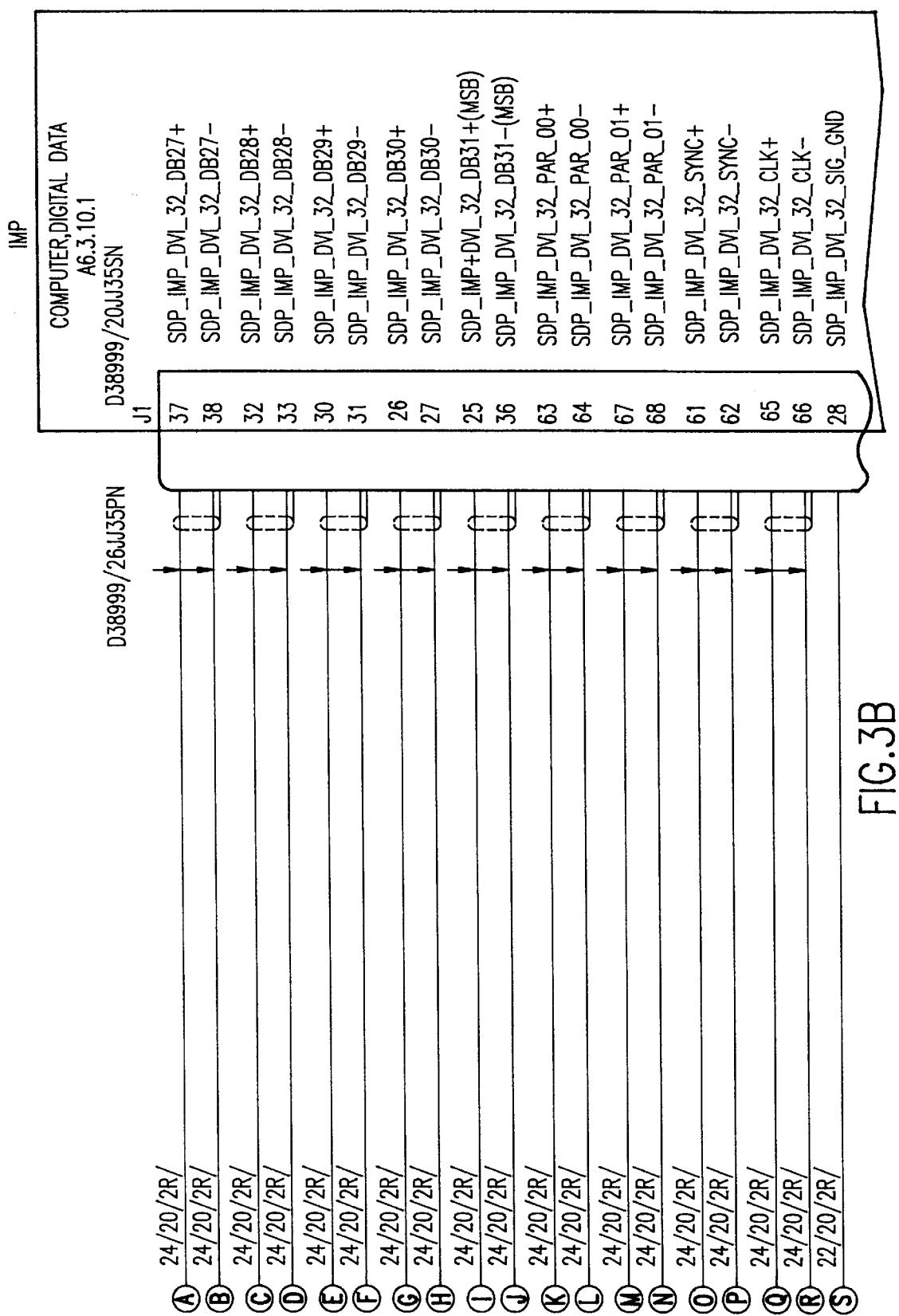
Figure 3C:
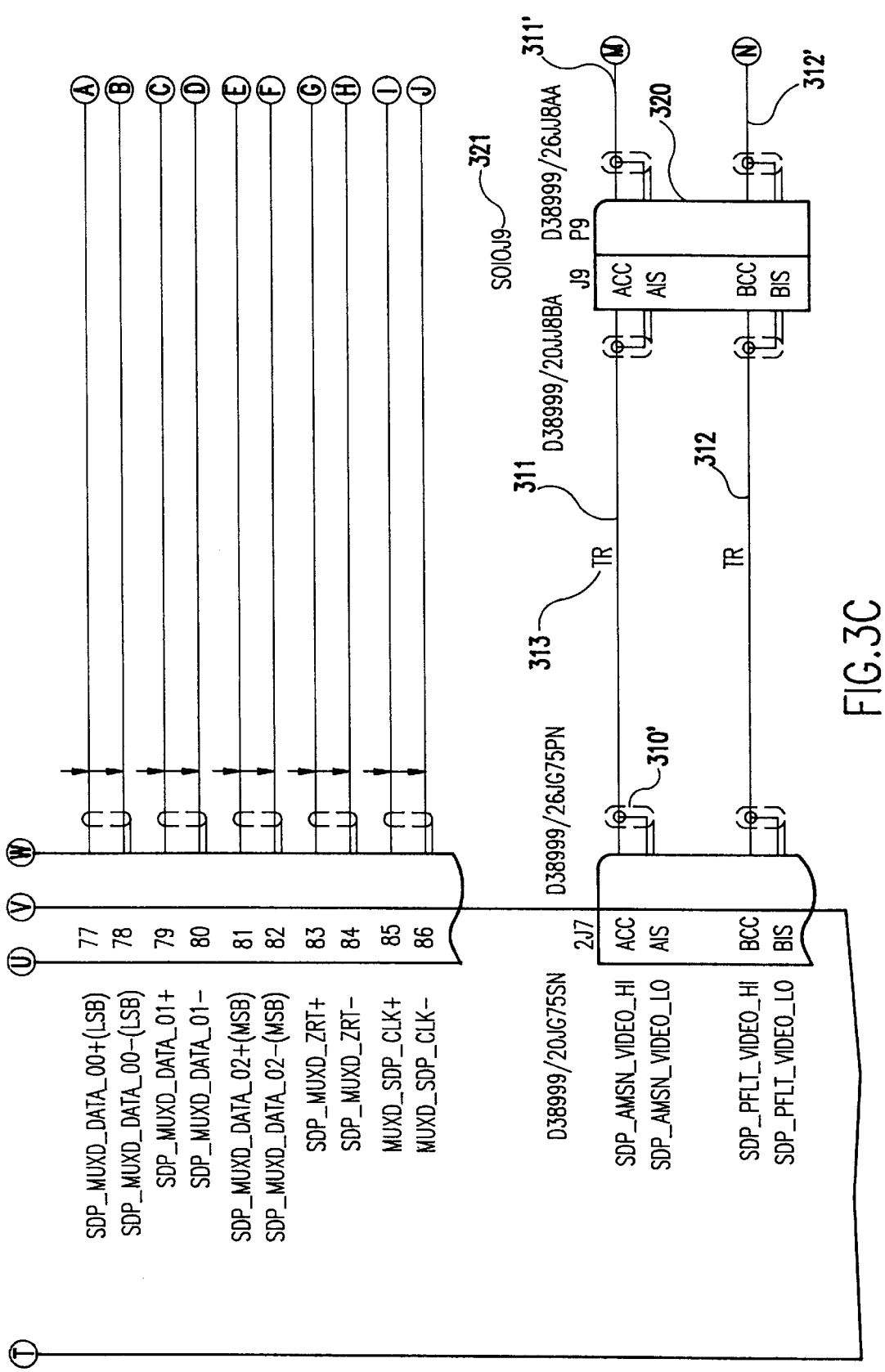
Figure 3D:
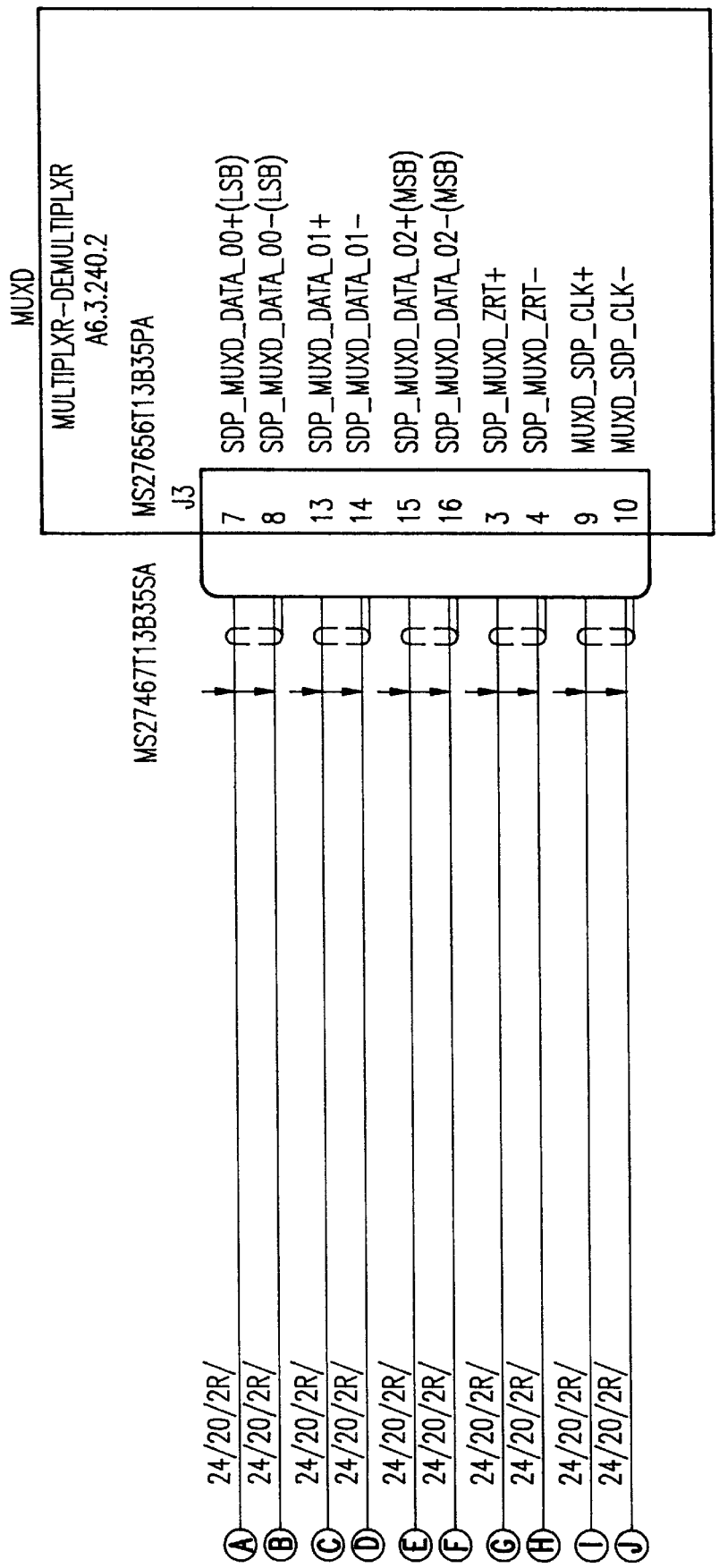
Figure 3E:
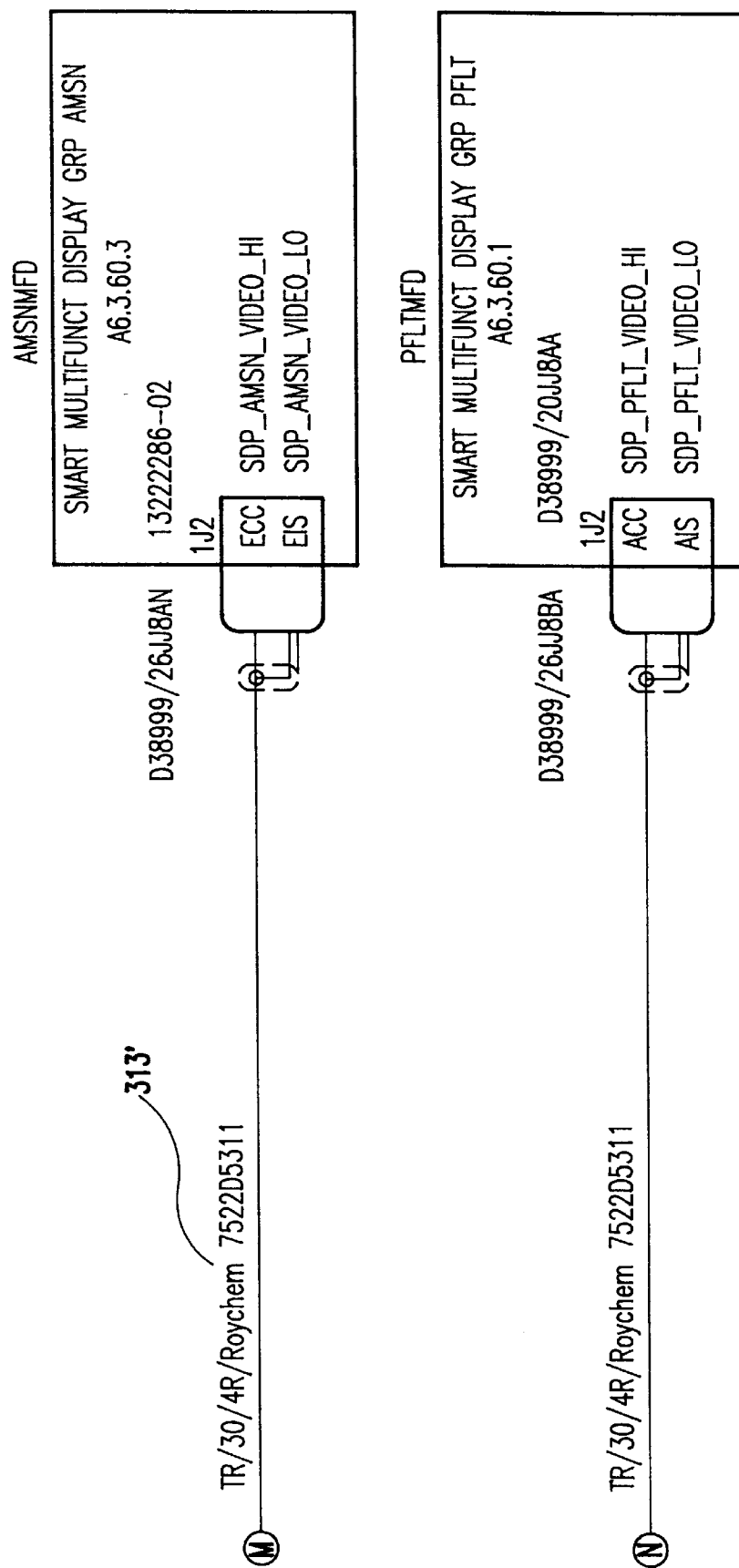

Referring now to FIGS. 2 and 3A–3E, hereinafter collectively referred to simply as FIG. 3, exemplary schematic drawings as provided by the invention, in its preferred application, are shown. In FIG. 2, a plurality of units are connected by two relatively simple cables. In FIG. 3, a portion of a relatively complex connection between a similar plurality of units is illustrated. It is intended that this discussion of exemplary schematic illustrations as produced by the invention will provide an understanding of the types of information which can be accommodated by the invention as an introduction to a detailed description of a preferred embodiment thereof and its operation.

In FIG. 2, a unit or box 201 is interconnected with two other units or boxes 210, 220, 210', 220', depicted as separate units in accordance with connectors but having the same unit or box identifiers, by two cables 250, 260 terminated in a portion of a single connector 202. That the termination is at a portion of a connector is indicated by a curved cut line 202'. Pin numbers within the connector 202 are shown at 203 and pin names are also provided as shown at, for example, 204. A box or unit identifier code is shown at 205 above each illustrated unit and a text name of the unit is provided as a label 205' within the depiction of the unit 201. A part number 206, 207 is provided for each portion of a connector 202 and a connector designator code 208 is preferably included.

The configuration of cables 250, 260 is depicted by the termination at connector 202 and the splitting of each cable at, for example, 209 to branch to connectors 232 and 242. (This splitting of the cable at 209 is a simple form of a splice since three pins are connected by each wire or subnet.) The nature of the wiring is depicted by a symbol at 251 to indicate a twisted pair of wires. A shield and its connection to a respective connection pin is shown by a symbol and schematic wire at 252 and the wire gauge is depicted at 253. Wire or shield colors, lengths and other physical parameters may be depicted in a manner similar to the wire gauge indication 253. This substantially realistic depiction of the cabling allows ready identification by assembly or service personnel.

Much the same types of information are shown in the more complex cable schematic of FIG. 3. Additionally, a further connector 320 is provided in connections 311-311' and 312-312' (where wire type changes as indicated by legends at 313, 313') and the connector is labelled as if it were a unit at 321. Further, shielded coaxial cable is indicated by the symbol at 310.

Figure 4:
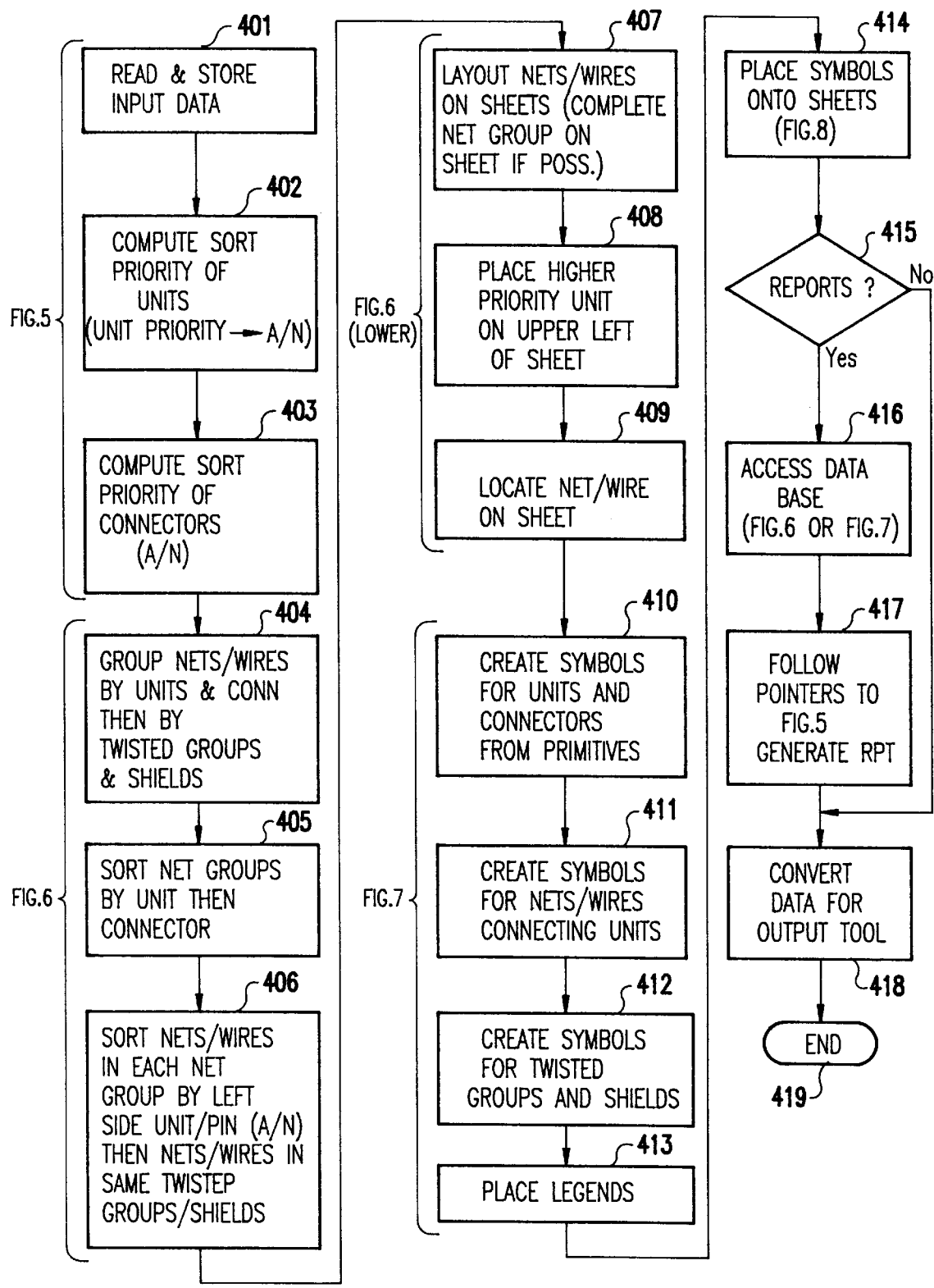
FIG. 4 is a flow diagram illustrating operation of the system of FIG. 1, FIGS. 5A, 5B, 6, 7A, 7B and 8 are depictions of exemplary database structures established in accordance with the flow diagram of FIG. 4, and FIGS. 9A, 9B and 9C are a depiction of an example of operation of the invention for database formation in accordance with FIG. 5 but correspondingly applicable to FIGS. 6–8.
Figure 5A:
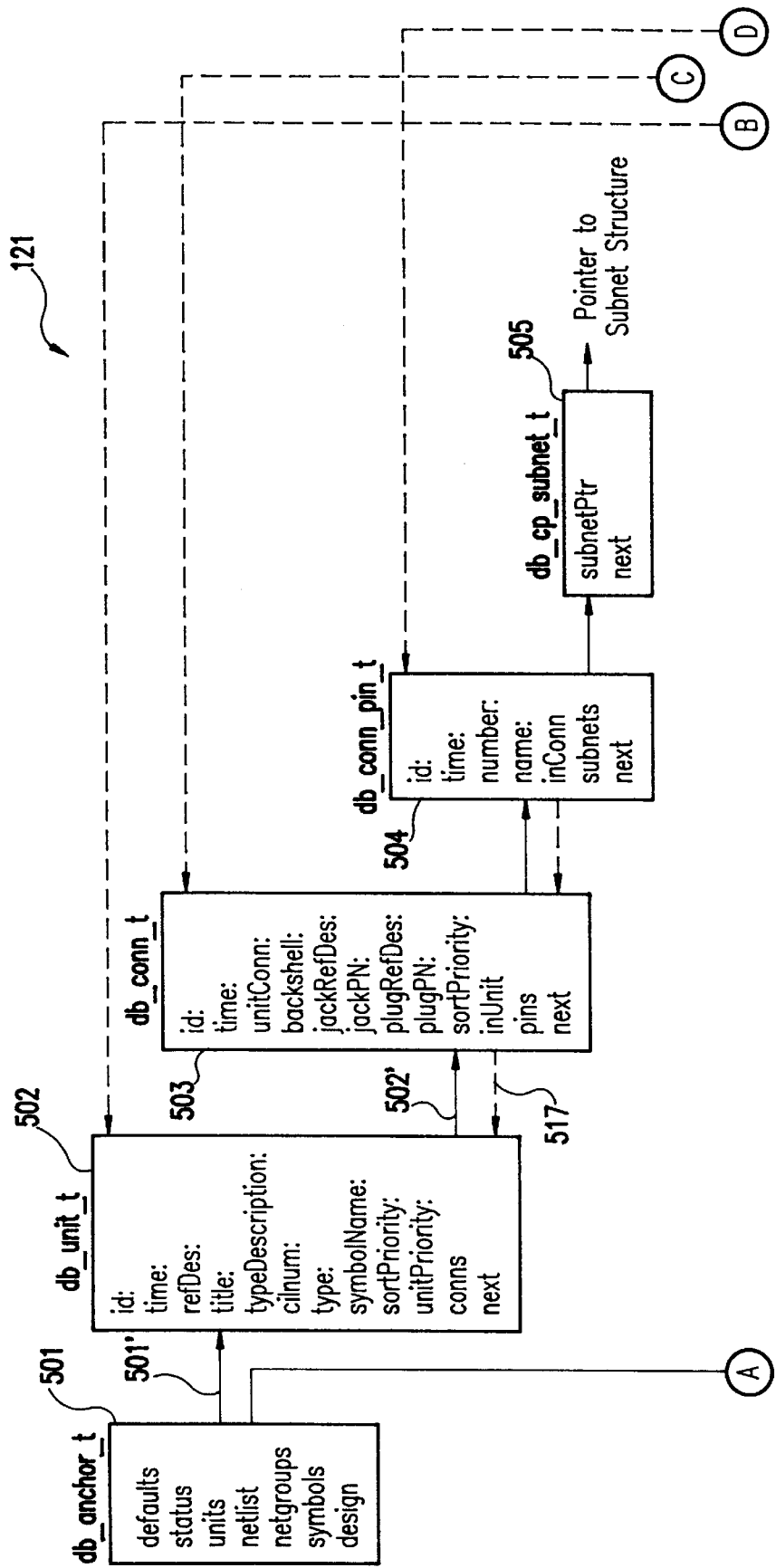
Figure 5B:
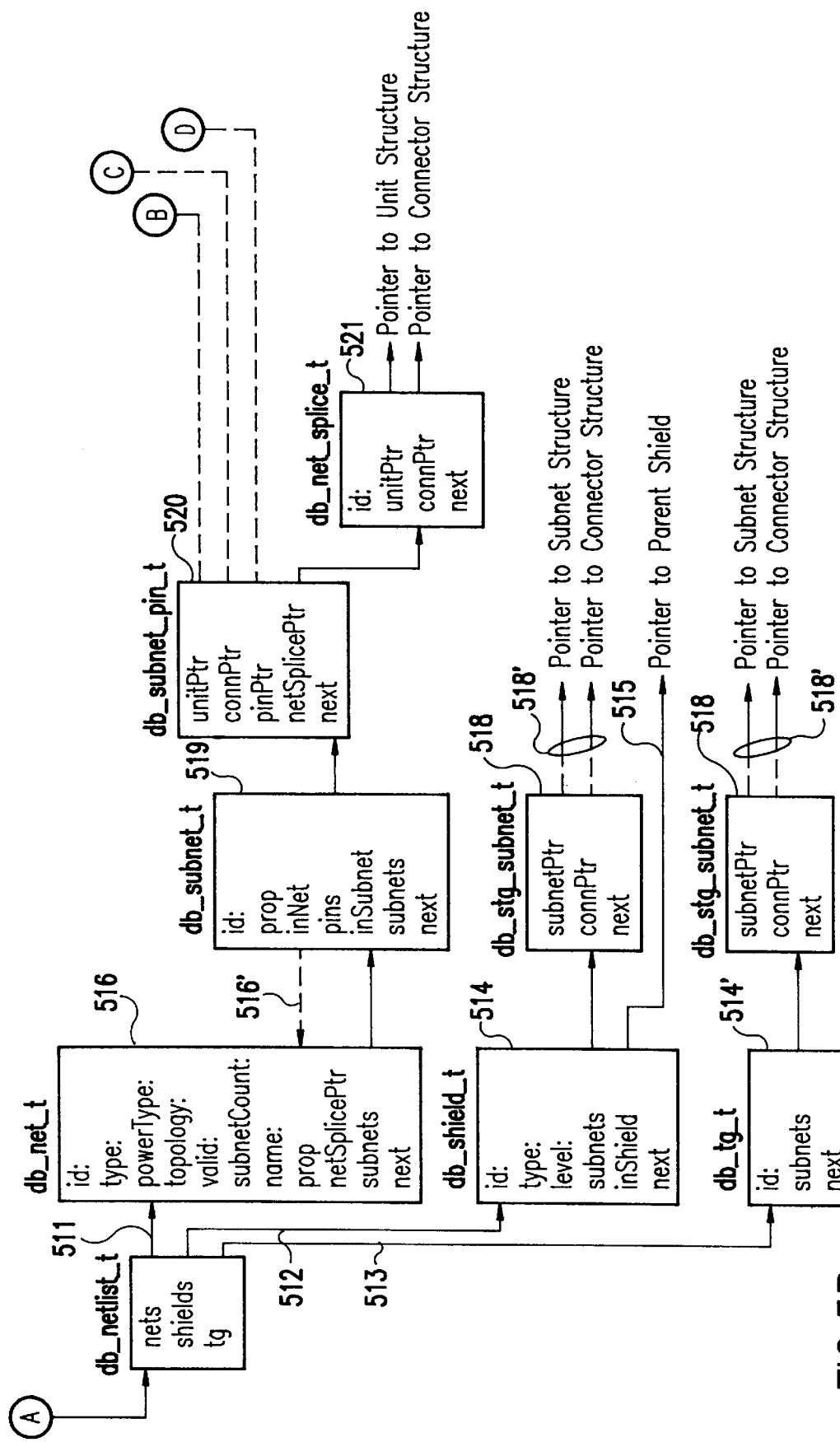

Referring now to FIG. 4 and FIGS. 5A, 5B (collectively referred to hereinafter as FIG. 5), 6, 7A, 7B (collectively referred to hereinafter as FIG. 7) and 8, it should be understood that portions of the operation of the invention reflected in the respective database organizations of FIGS. 5–8 correspond directly to the operations depicted in FIG. 4 which generate or map data for respective fields in the respective database organizations. It should be noted that the number of fields in each table of the database organizations of FIGS. 5–8 is arbitrary; the number and identity of the fields shown being preferred for the particular preferred application by which the invention will be explained below. By the same token, the fields which do not relate to pointers to other tables contain arbitrary information but which is preferred for this application and which provides either an internal system reference or a legend or label to be produced in the drawings. Therefore, fields not associated with pointers are not otherwise important to the operation of the invention and need not be individually discussed.

The operation of the invention begins with reading available data from the input section 110 (FIG. 1) as depicted at 401 of FIG. 4. It is preferred that data read be entered into the database cumulatively except for such instances for which updated data is provided. This is desirable since the invention can be used to incrementally detect any errors or inconsistencies in the data currently entered with regard to data previously entered and a report can be generated and corrections undertaken to resolve the data conflict. This is a function provided by well-known and understood database applications and programming languages, such as C, the details of which are not important to the invention. Further, no operation outside the database or data structure being accumulated is required. Data accumulation is also preferred since it is expected that any particular group of input data will be fragmentary and specific to one or more units but less than the overall design; the data being furnished by the suppliers or designers of those units which are components of the overall system being designed.

It is also preferred that a time stamp be provided for each new or updated data as it is entered into the database. The data is entered in the appropriate entity table hierarchy level (e.g. 501, 502, 503, 504 of FIG. 5) and the appropriate field in each entity table entry by following internal pointers established in the definition of the data model to which the database corresponds. For example, the identity of a unit would be entered as an attribute in db_anchor_t table 501 and as an entity ID in the db_unit_t table 502 following pointer 501'. By the same token, a connection from the input point-to-point connectivity data would not be stored in the db_anchor_t table but would follow pointer 501' and be stored as an attribute ("conns") in the db_unit_t table and, following pointer 502' from that attribute, would be stored as an ID in the db_conn_t table 503 along with other connection attributes contained in the input data (including a reference number of the ID indicated as a "next" attribute as a pointer to another instance in the same entity table), and so on for connector pins and connector pin subnets in tables 504 and 505.

Information concerning nets (the point-to-point connectivity information, which may include three or more connected points including, for example, connections within a connector, referred to as a splice) is similarly propagated through the db_netlist_t table except that different attributes of nets, shields and tg (twisted groups) each have a separate pointer, 511, 512 and 513, respectively, to a following hierarchy of entity tables. It should be noted that while information is thus provided for some of the attributes established by defining the data model, other attributes are generated by operation of the system and method in accordance with the invention.

Specifically, referring again to FIG. 4, after all available data has been entered from input section 110, the database is caused to provide a sort 402 in the db_unit_t table 502 based on the unitPriority attribute and, among units having the same value for that attribute, sorting alphanumerically on the ID attribute. Based on the results of this sort, sortPriority attribute values are generated and entered into the appropriate field of an instance within the unit entity table 502.

Similarly, as illustrated at 403 of FIG. 4, an alphanumeric sort on the jack or plug reference designator (depending on which is part of the unit) field of the db_conn_t entity table 503 is performed and the results entered in sortPriority fields of respective instances therein. Sorts may not be necessary for generating priority values in some entity tables since unique priority information may be implicit, such as the pin numbers for a particular connector in db_conn_pin_t table 504. In other cases such as nets, shields and twisted groups, priority order for purposes of drawings is established in accordance with the priority of units, connectors and pins connected and no further sorting is necessary or useful to the production of the drawings by the invention. Nevertheless, a sort on pin numbers or any other entity based on alphanumeric or other criteria can be performed if desired or required by the nature of input data or the desired depictions to be generated by the invention.

In this regard, it should be noted that the database organization of FIG. 5 provides for upward referenced relationships or pointers in the hierarchy of entities 502, 503, 504 as indicated, for example, by pointer 517, to indicate the unit in which the connector exists. Likewise, the entity db_conn_pin_t includes a similar pointer to the connector in which the pin exists. These pointers are useful in propagating updated data and searching for and collecting data for reports in a manner well-understood in regard to basic database operations.

The same type of function is provided in the net, shield and twisted group entities but some modifications are necessary to accommodate the particular combinations of physical features which may exist together. Specifically, pointer 516' references the net in which a subnet exists in the manner described above. However since either a subnet or a net could be embodied in or as a twisted group either with or without a shield (which may or may not be nested with other shields), both of tables 514 and 514' share a portion of the db_stg_subnet_t table 518 which contains pointers 518' to both the subnet table 519 and the connector table 503.

The pointer to the connector table allows direct access to connector attributes and relationships (e.g. to db_unit_t and/or db_conn_pin_t) and avoids the need for pointers through db_netlist_t and the anchor table 501. The subnet pointer avoids duplication of data and attendant processing overhead for access to subnet attributes and relationships (e.g. to db_net_t) as well as an alternate access route to unit, connector and pin attributes and relationships through pointers preferably provided by the db_subnet_pin_t table 520 accessed through the pins attribute of table 519 which also avoids the need for pointers in the higher order db_netlist_t table. Further, while nets or subnets could be used in a manner to define splices (e.g. common connections to three or more points), it is considered preferable to decompose subnets or nets into two or more subnets or nets containing a splice and which are linked by a splice pointer attribute for access to db_net_splice table 521 which contains pointers to a unit and connection as well as the next splice of the net.

It should be noted that the sorting described above is done principally in preparation for dividing the schematic, initially developed as if to be produced on a single, infinite, sheet, into sections as will be described in detail below, each having content suitable for production on a single sheet of drawing of convenient size and to maintain a logical and prioritized order of such sheets as well as depictions of connections in the schematic diagrams produced thereon. Again, it is contemplated that the invention is most useful for depicting complex systems interconnections which cannot be depicted on a single sheet or a small enough number of sheets to be handled by a single designer or draftsman. The principal purpose of the invention is to automate depiction of larger systems so that changes can be implemented in short turn-around times and inconsistencies between designers and draftsmen and errors due to human intervention avoided, especially in complex systems in which such errors are inherently less evident to a designer or draftsman. Further, it is desirable that the system of the invention provide a logical order of drawings and a logical nexus between portions of drawings which must be depicted on separate sheets. In this regard, it is desirable that the drawings be created in a consistent format with the higher priority unit at the left (or upper left if more than one) on a sheet and that the cables depict connections to sequentially lower priority units proceeding, in order, to the right on each sheet.

Therefore, the initial sorting described above is provided to establish an order of processing and development of drawing content which is maintained throughout subsequent processing and reflected in the final multi-sheet drawing product. By the same token, different ordering, division of the drawing and format can be obtained by altering sort order, sort priority, sort field, names (IDs), and the like as may be desired and it is to be clearly understood that the above-discussed sort criteria reflect the preferred embodiment and application of the invention. The use of sorting is important to the understanding of the principles of the invention particularly as applied to large and highly complex designs but the particulars of the sorting process are not critical to the practice thereof.

Figure 9A:
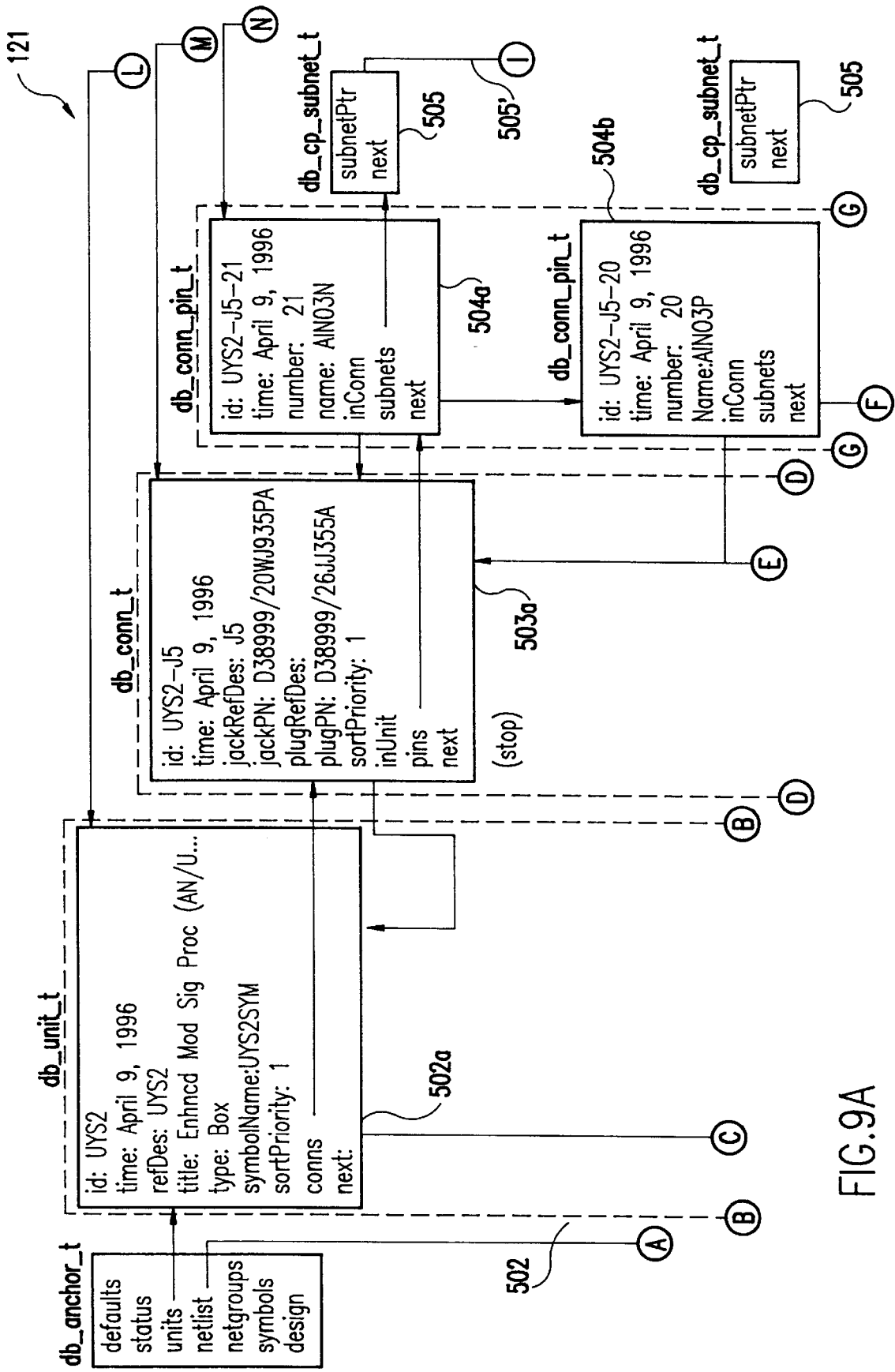
Figure 9B:
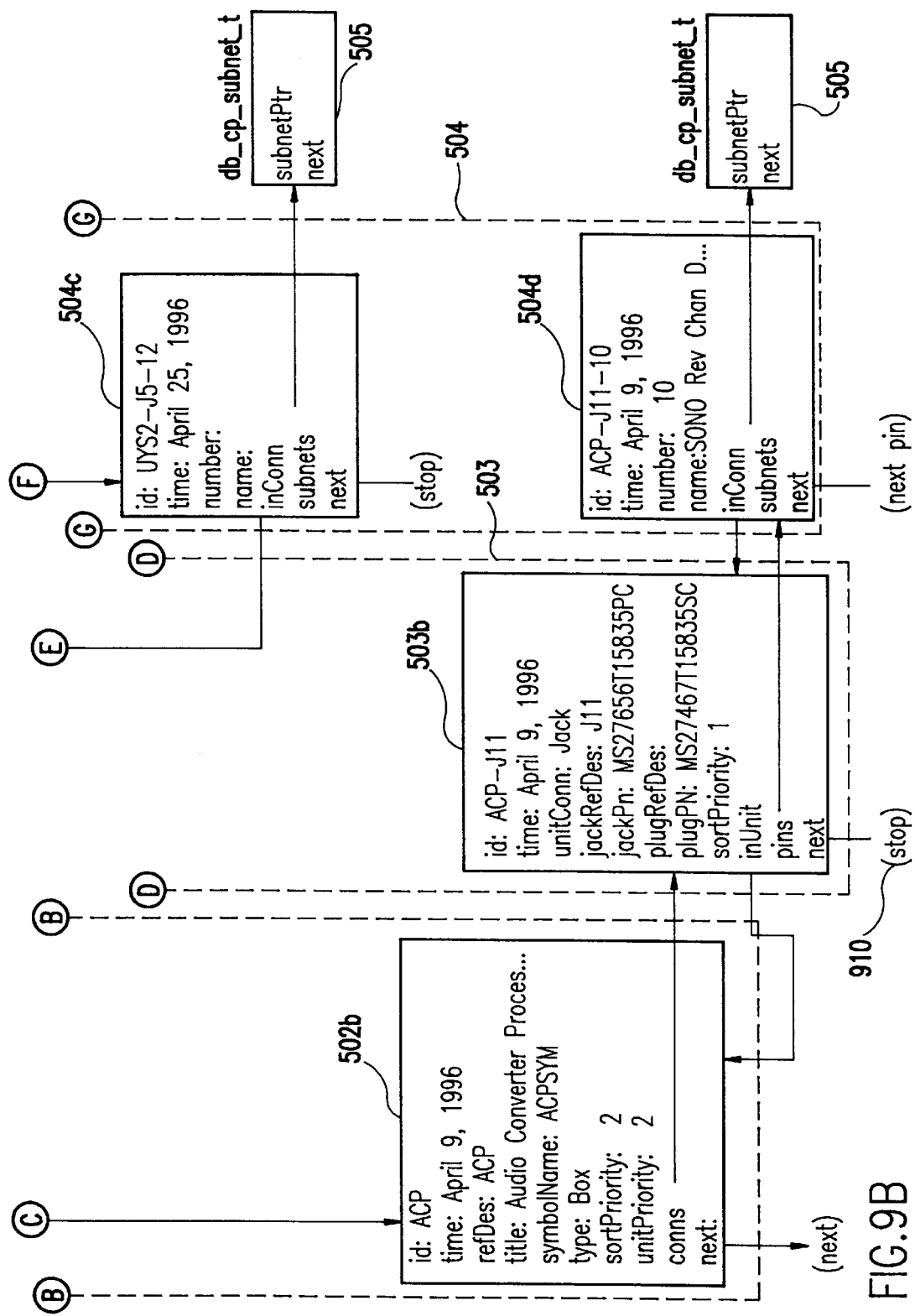
Figure 9C:
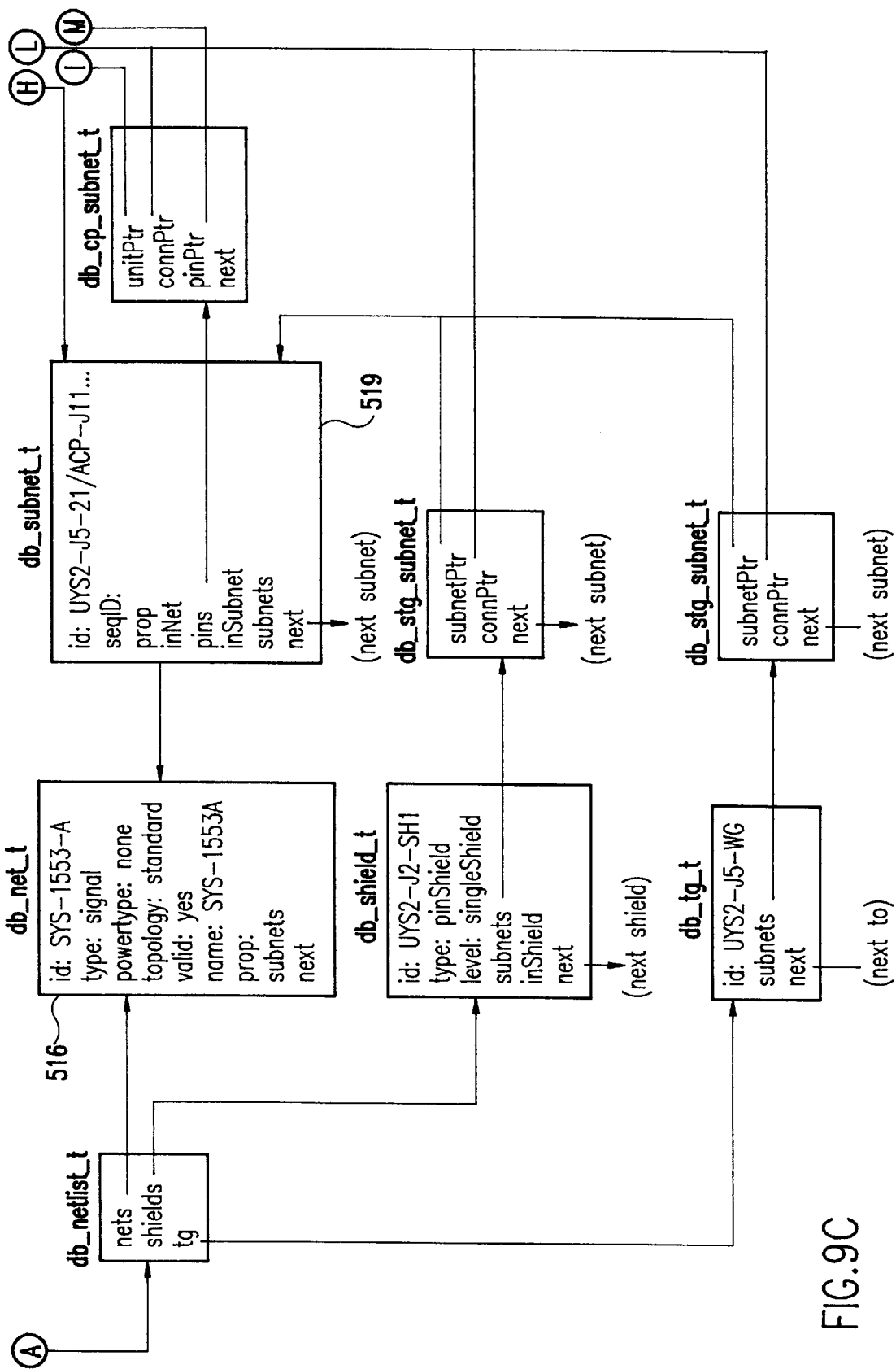

At this point (after 403 of FIG. 4), the database organization of FIG. 5 should be complete. FIGS. 9A and 9B, hereinafter collectively referred to as FIG. 9, show the state of a portion of the data structure of FIG. 5 upon entry of point-to-point connectivity data and the sorting as described above for the depiction of FIG. 2. It is important to note that the UYS2 unit 201 at the left (higher priority) side of FIG. 2 appears as an instance 502a of db_unit_t table 502. Following through the connection table 503, showing connector UYS2-J5 as the ID of the instance and part numbers of the mating plug and jack, to the pins table 504, each of pins 21, 20 and 12 (top to bottom priority) in the connector in FIG. 2 appears as a separate instance 504a, 504b, 504c of the connection to a pin of connector J5 to unit UYS2. Each of tables 501–503 also includes a time stamp indicating the most recent entry or modification of this data. The subnet pointer 505', omitted from FIG. 5 for clarity, is also shown.

Similarly, the unit ACP at the right (lower priority) side but at the (higher priority among right-side units) top of FIG. 2 appears as a second instance 502b of db_unit_t table 502, connector J11 of unit ACP appears as the ID of an instance 503b of connector table 503 and pin instance 504d of connection pin table 504 indicates the first pin number (in ascending or descending order top-to-bottom) of FIG. 2 (while not necessarily so ordered in the tables).

The nets, including shield and twisted group information for the connection from pin 21 of connector J5 of unit UYS2 to pin 10 of connector J11 of unit ACP is indicated as a subnet UYS2-J5.21/ACP-J1 . . . of net SYS-1553-A (both essentially arbitrary ID designations but potentially descriptive in an arbitrarily coded fashion in this case since it is not shown as a label or legend in FIG. 2 but could be shown if desired). Pointers similar to 505' are provided but not shown for each wire or subnet. (In this regard, it should be noted that a wire can be represented as either a net or subnet. In this case, however, since the wire is a member of a twisted group as well as being commonly shielded with other wires, it will necessarily be represented as a subnet.)

To assure that entry of data in the data structures of FIG. 5 or FIG. 9 is complete, the "next" attribute of each entity table provides an exhaustive ordering of instances which is independent of the prioritization achieved by the above sorting. This ordering can thus be scanned to assure the completion of database entries or for any other purpose. Designations such as is indicated by "(stop)" at 910 of FIG. 9 can also be used to indicate completion of a net or splice, as desired. However, other than for conducting such checks for completion of a process or some other purpose, the "next" attribute does not affect the operation of the invention.

It should also be appreciated that the relational database organization of FIG. 5 contains all information concerning each wire or net contained in the point-to-point connectivity information which is input and which has been accumulated. The relationships embodied by the pointers illustrated provide access to all attributes at any level and identify all units, connectors, pins, nets/wires, shields and wire structures (e.g. by virtue of the ID attribute in each of the corresponding entity tables) and thus can support searching and reporting of any data in the cabling design.

It should be further appreciated in the following discussion of the further database organizations illustrated in FIGS. 6–8, that each of these Figures contains the same highest order db_anchor_t table 501 but that a different data field (which can be considered as either an attribute or a relationship in a relational database) is used for entry into each respective database organization. It should be further appreciated that a substantial number of data items depicted as attributes in each entity table of FIGS. 6–8 actually exist in the entity tables of FIG. 5 and should be considered as pointers in FIGS. 6–8. While duplication of data is possible, it has generally not been found desirable. Thus, by accessing the respective further data structures through the same db_anchor_t anchor entity table 501 but through a different field/pointer, the instances of that attribute (corresponding to an entity at the next lower hierarchical level) may be accessed in order and the corresponding attributes mapped into the respective database organization from the database organization of FIG. 5 by ID or other attribute identification. This mapping or building process is very similar to the initial storing of data in the database organization of FIG. 5 and can be done with known or custom database utilities or, preferably, C-language system calls as alluded to above and which will be well-understood from this description by those skilled in the art. In C-language system calls, for example, the system call will obtain and configure additional memory in accordance with the desired database organization to receive data from previously stored fields but to place it in the format defined in accordance with the desired database organization.

Figure 6:
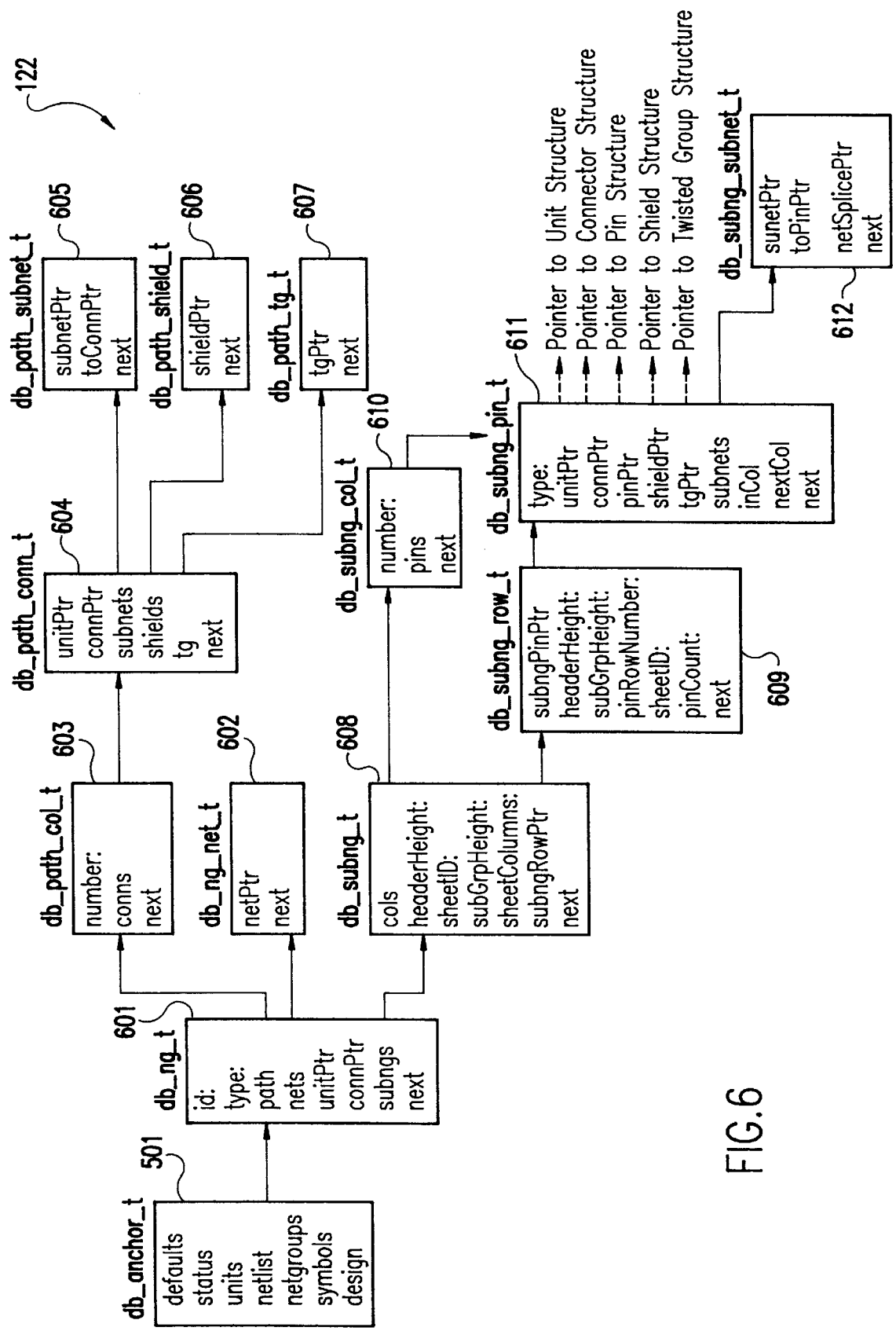
Figure 7A:
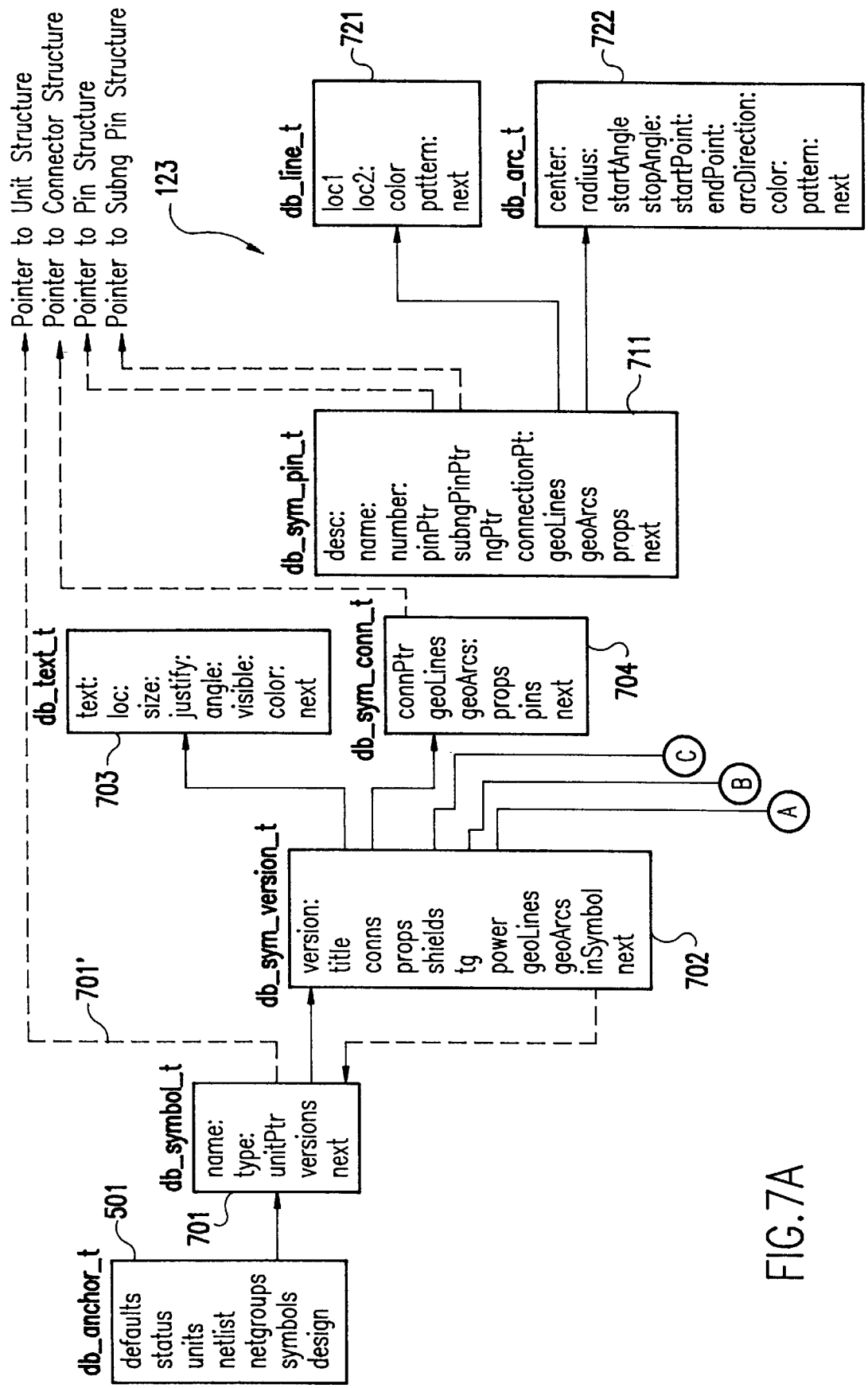
Figure 7B:
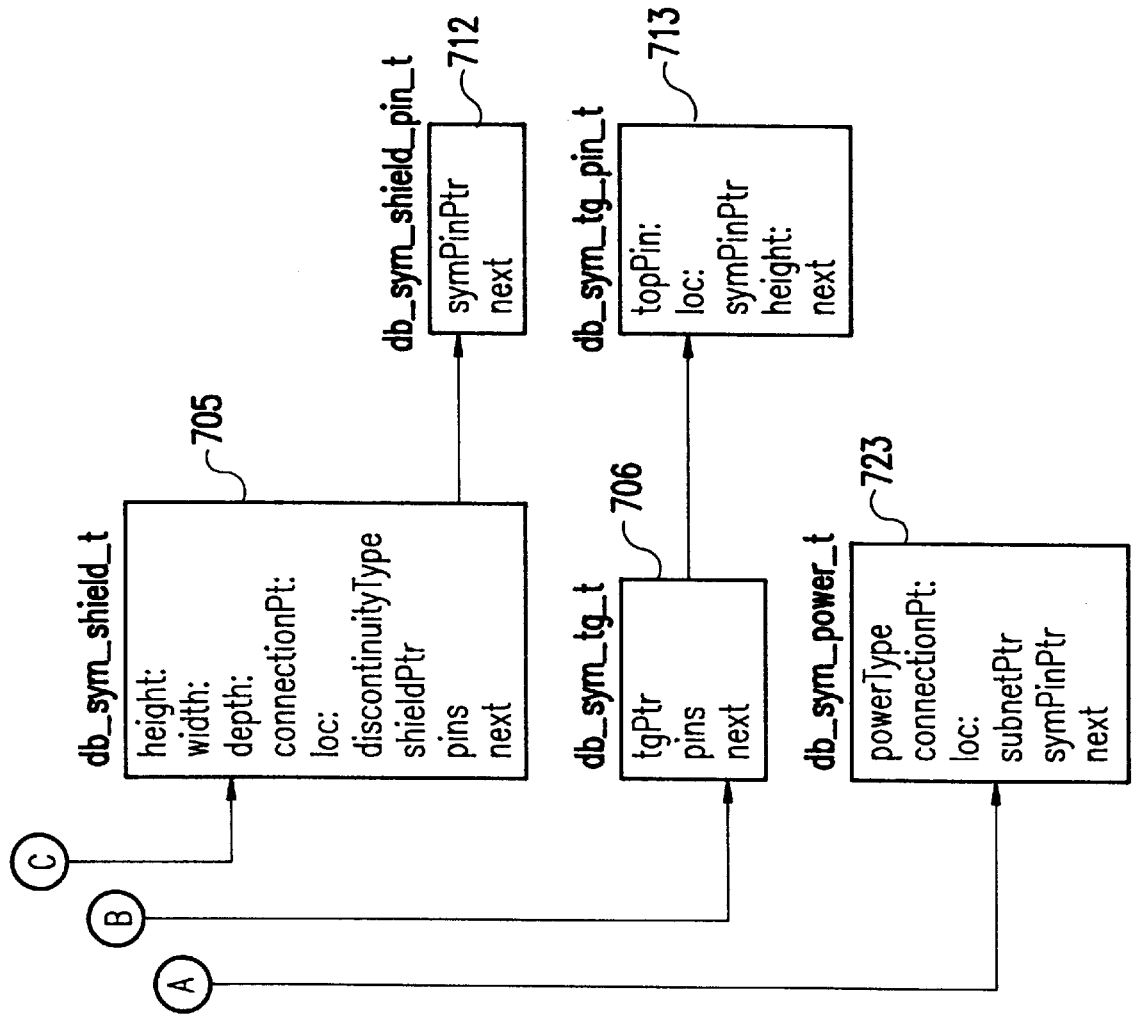

Referring now specifically to FIGS. 5 and 6, within each hierarchy following a respective one of pointers 511–513 (FIG. 5) from db_netlist_t, nets are grouped (without computing priority between them). The nets/wires are preferably grouped first in accordance with the units and connectors to which they attach and then by twisted groups and by shields as shown at 404 of FIG. 4. That is, this grouping follows the physical attributes of nets and wires which have a specified connectivity in the original data.

For any connectivity, some connections may be formed as twisted groups and twisted groups may be provided with shielding which may itself be nested with (e.g. either inside or outside) another shield. If nesting of shields forms part of the design, the nesting order (in the form of a pointer to the parent shield) forms the inShield attribute in the db_shield_t entity table 514 which is effectively a pointer 515 to the next shield (outside the current shield instance, by convention) in the nested array of shields.

This grouping and sorting forms the nets into prioritized net groups for entry as instances into db_ng_t at 601 of FIG. 6 with propagation of attributes and pointers to entity tables db_ng_net_t 602 (to provide reference back to the original net and reflect the priority thereof, and to db_path_col_t 603 by computing, based on previously established priority, an estimate of a column of the "infinite sheet" drawing in which the net group will appear. The grouping also provides for segregation of data by function which is useful for some types of reports and diagrams of operational architecture of the system and the like and functionally organized reference back to the database organization of FIG. 5 by pointers from tables 604–607.

While the column computation is not critical to the practice of the invention, the space on the "infinite sheet" required for units, connectors and pins is known and the computation is essentially a summation of those distances (and the distances allotted to higher priority net groups) from left to right to find the starting point of the path. The connector attribute or field of table 603 provides a pointer to db_path_conn_t which, in turn, provides pointer references back to the units and connections entity tables of FIG. 5. Other pointers are provided to tables 605, 606 and 607 which, in turn provide further pointers to subnets, connections, shields and twisted groups. These further tables are important to the practice of the invention to the extent that plural nets and/or subnets may exist in a net group and thus require selection between pointers for reference to the appropriate net and/or subnet and related structures (e.g. shields, twisted groups, connectors and the like).

Thus, starting with the netgroups attribute in the anchor table, the db_ng_t table 601 is constructed with the path attribute defined by the units connected. From this information, the db_ng_net_t table 602 is constructed by providing a net pointer and a next pointer back to db_net_t table 516 of FIG. 5. These pointers allow accessing of net attributes from the database organization of FIG. 5 and for exhaustively iterating through the instances of nets. At the same time the data is accessed from db_net_t table 516 for storage in the db_path_col_t table 603, it is grouped by units and then connections and assigned a number which is stored to indicate a column in the drawing to which the higher priority unit will be assigned, as illustrated at 404 of FIG. 4.

Once the nets/wires are thus grouped, the groups/net groups are sorted, if necessary, by unit priorities and then by connector priorities to correspond to the order in which the units and connections are placed in order on ordered sheets in the final drawing product, as shown at 405 of FIG. 4. Then, as illustrated at 406, the nets/wires in each net group are sorted, if necessary, by pin number and the process is repeated for twisted groups and shields. The result of each sort is used to provide the "next" attribute in each table 601–607 described above. These sorting operations may not be necessary if the "next" attribute can be provided from or is implicit in the data organization of FIG. 5 (or 9).

Then, as illustrated in the lower portion of FIG. 6, the subnet groups are accessed in order within each path (likewise in path order) and the column(s) in which it appears. Thus, to build db_subng_t table 608, a computation (407 of FIG. 4) is performed similar to that for columns, described above, in which the header height and the subgroup height (based on number of nets and connector pin locations) are computed by summation from top to bottom and the "infinite sheet" divided by rows and columns and assigned a sheetID and order number.

The specifics of placement of connectors and nets on each sheet is then refined, as shown at 408 and 409 of FIG. 4 to achieve the desired unit-connector-cable-connector-unit format across each sheet (preferably such that, while other units or connectors may appear in a cable, as shown in FIG. 3, the depiction on each sheet terminates with a unit at the left and right of each sheet) and such that the net groups will be logically allocated to each sheet in complete net groups, if possible. The results of this processing is entered in appropriate fields of tables 609 and 610, respectively, and appropriate pointers for each net to units, connectors, pins, subnets, shields and twisted groups in the database organization of FIG. 5 propagated to table 611. As above, when selection must be done between particular instances (or even nested groups of instances) in accordance with, for example, subnetgroups or the like, one or more further tables of pointers such as 612 may be provided.

It should be further noted from FIG. 6 that the unit pointer and connection pointer are stored to db_path_conn_t table 604 from table 520 of FIG. 5 and accessed from the connector attribute of table 603, pointing to another connector at the end of the connection and to be depicted at the right end of each cable, as in FIG. 3. The subnet, shields and tg attributes are derived from tables 516, 514 and 514' of FIG. 5 and used to access subnet, connector, shield and tg (twisted group) pointers back to the database organization of FIG. 5 which are stored in tables 605, 606 and 607, respectively. This process of grouping, sorting and providing reference back to the database organization of FIG. 5 from 611 of FIG. 6 builds an identity for each net group, establishes a priority among them for drawing placement as described above and also limits the need for duplication of data (and computational overhead while building each data structure) while allowing reports such as parts lists to be developed in a manner based upon and referenced to the schematic drawing sheets produced in accordance with the invention. This data referencing function thus supplements or is supplemented by the prioritized functional references to FIG. 5 by pointers from 604–607, as noted above.

Referring now to FIG. 7, a further database organization is shown which is built from the database organizations of FIGS. 5 and 6. The purpose of this database is to develop symbols from graphic primitives in accordance with the units, connectors and pins data of FIG. 5 and to develop the initial layout for each sheet which was developed while building the database organization of FIG. 6. In this case, the database organization is accessed from the "symbols" attribute of db_anchor_t 501 which provides access to instances of IDs in db_symbol_t table. Since each symbol is ultimately based on a unit in the preferred embodiment of the invention pointer 701' is preferably provided to allow direct access to the particulars of each unit.

Different versions of symbols of a common type such as different depictions of connectors preferably are provided by the versions attribute or field of a symbol instance and the specifics provided as fields or attributes in the db_sym_version_t table 702. Since there is a nested relationship of pins, connectors and units, it is preferred to provide an inSymbol pointer 710 to indicate the dependency of each symbol on the parent symbol with which it is associated or in which it is included. Among the other attributes, the title of the version is used to specify the visual attributes of text to be applied to the symbol as stored as attributes in db_text_t table 703. Since these attributes are specific only to the rendering of the drawing, no further pointers from table 703 are necessary in this particular application of the invention. Other attributes or fields of table 702 similarly provide pointers or links to further tables including primitives such as arcs and lines as indicated at 704 or particular additional symbology such as for discontinuous shield attribute in the db_sym_shield_t table 705.

It should be noted that only a single symbol is provided to indicate a member of a twisted group and the only further references required in table 706 are for the next twisted group and to attribute topPin at 713 to indicate the start of the twisted group, a pointer to db_tg_t table 514' in FIG. 5 and a pointer to the pins to which the twisted group is connected, the visual attributes of which are contained in db_sym_tg_pin_t table 713. A similar reference is made to the visual attributes of the pins for connection of a shield in the db_sym_shield_pin_t table 712 from the pins attribute of table 705. In contrast, the pins attribute of the db_sym_conn_t table 704 provides reference to the db_sym_pin_t table 711 which provides a pin (structure) pointer to FIG. 5 and a subngPin pointer to table 611 of FIG. 6. The number of pins attribute provides a pointer to the visual locations and visual attributes of the pin depictions in db_line_t table 721 and the geoArcs attribute provides a similar pointer to db_arc_t table 722 for the specifics of the rendering.

In a similar manner, the power attribute in table 702 provides access to attributes, including legends, for power connections. Other special types of wiring (e.g. coaxial cable with the shield providing the ground return, connections to non-electrical structure such as an airframe, a wire wrapped around a group of parallel wires, etc.) can also be provided for in the same way.

The building of the data organization of FIG. 7 thus proceeds by the building of symbols for units and connectors as shown at 410 of FIG. 4 to supply data for table 702 and further data generated and propagated to tables 711–713, 721 and 722 and then creates symbols for the wires by group, type and shield for entry in tables 704–706 and 723 as shown at 411 and 412 of FIG. 4. Finally, legends are placed as shown at 413 of FIG. 4 and stored in table 703 of FIG. 7. While the legends could be generated and placed at any time, it is preferable to place them in locations which will be properly juxtaposed with but not overlap the symbols generated. Therefore, it is preferable that the data organization be otherwise completed prior to completion of table 703.

It should be understood that the data now in the database organization of FIG. 7 now includes all of the information to place all unit, connector, pin and net information in each of a plurality of schematic drawings. The final database organization of FIG. 8 is built to instantiate each of these symbols and additional image portions such as a border, drawing numbers codes, sheet numbers and the like for control of production of individual sheets of drawings. Proceeding from the "design" attribute of anchor table 501, the format of the drawings is established in table 801 by user input. The remainder of the tables 802–805 are built by extraction of data from the database organization of FIG. 7 in the same manner as the building of the database organizations of FIGS. 5–7 and a description thereof need not be repeated. The database organization of FIG. 8 is thus a generic form of tool commands which can be translated by an appropriate driver in output section 130 of FIG. 1 or used directly to drive a suitably adapted output device or tool.

Figure 8:
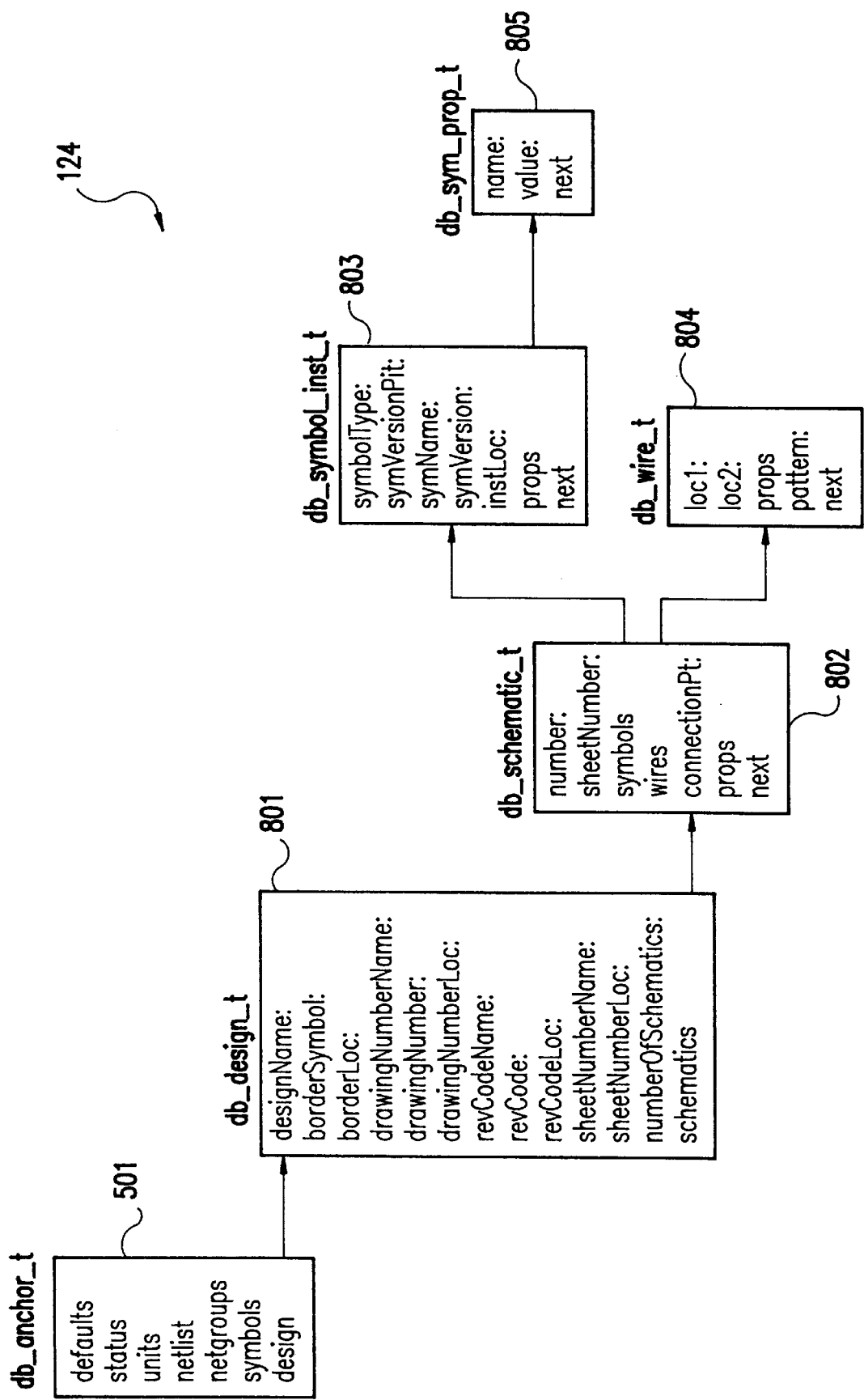

It should also be noted that while the database organization of FIG. 8 is a set of generic commands for production of drawings, the allocation of subject matter to each sheet is contained in the database organization of FIG. 7. Therefore to collect information for reports in a manner referenced to the drawings, the pointers in FIGS. 6 and 7 back to FIG. 5 (or 9) is entirely sufficient for production of reports, functional block diagrams and the like and no pointers back from FIG. 8 are needed.

It should also be appreciated that while the preferred embodiment of the invention accepts raw connectivity data and builds the data organization of FIG. 5 preparatory to building additional data structures with data propagated thereto and computed therefrom or input by a user, the principles of the invention are applicable to organizing and partitioning any large body of data which is available in any form. For example, data could be input to the invention as a complete data organization as it exists in FIG. 5 or comparable data convertible to such form from which additional data organizations and pointers can be built. Thus the building of further data structures and pointers is effective to organize and partition any large body of data to facilitate the extraction of information therefrom in a desired form.

In view of the foregoing, it is seen that the invention provides for the development or building of a sequential series of data structures or database organizations, each having forward and backward reference pointers between the data structures. The building of this sequential series of data structures organizes raw point-to-point connectivity data in stages in accordance with desired functional capabilities of the invention to produce schematic drawings of cabling designs as well as the production of reports (e.g. parts lists), functional block diagrams and the like in a manner referenced to the schematic drawings either by single sheet, a plurality of sheets or a portion of one or more sheets as well as functionally by net groups, or similarly organized groupings as they might exist in other complex system designs to which the invention may be applied. As applied to electrically connected systems, the invention provides an efficient tool for design of detailed cabled wiring and schematic depiction thereof and partitions and maintains data in a form in which inconsistencies may be resolved and manufacturing and documentation information extracted readily. Changes in design can be tracked and documented and reflected in new drawings and reports, block diagrams at different levels of abstraction and the like referenced thereto with short turn-around time.

While the invention has been described in terms of a single preferred embodiment, those skilled in the art will recognize that the invention can be practiced with modification within the spirit and scope of the appended claims.

Having thus described the invention, what we claim as new and desire to secure by Letters Patent is as follows:

1. A method of organizing and partitioning a large body of data including the steps of inputting a body of data, building a first data structure in accordance with a first data model, said first data structure including said body of data and data derived by processing said body of data, building a second data structure in accordance with a second data model, said data structure including said data from said first data structure and data derived by processing said data from said first data structure in accordance with pointers from fields of said first data structure to said second data structure, wherein fields of said second data structure include pointers to instances of data included in said first data structure.

2. A method as recited in claim 1, wherein each of said first and second data structures includes an anchor data structure, said first and second data structures being accessible in accordance with respective fields in said anchor data structure.

3. A method as recited in claim 1, wherein said processing of said body of data includes a step of sorting of said body of data.

4. A method as recited in claim 3, wherein said sorting of said body of data establishes a priority between instances of data in said body of data.

5. A method as recited in claim 1, wherein said processing of said body of data includes a step of grouping instances of data in said body of data.

6. A method as recited in claim 5, including the further step of sorting of groups of data established by said grouping step.

7. A method as recited in claim 3, wherein said processing of said body of data includes a step of grouping instances of data in said body of data.

8. A method as recited in claim 7, including the further step of sorting of groups of data established by said grouping step.

9. A method as recited in claim 1, wherein one of said processing steps includes assignment of visual attributes to instances of data in said second data structure.

10. A method as recited in claim 9, wherein said visual attributes include graphic primitives.

11. A method as recited in claim 10, including the further step of rendering a schematic drawing.

12. A method as recited in claim 11, including the further step of accessing data from said first data structure in accordance with said schematic drawing.

13. A method as recited in claim 11, wherein said step of accessing data from said first data structure in accordance with said schematic drawing includes the further step of developing a report of content of said schematic drawing.

14. A method of preparing schematic drawings of electrical connections between units of a physical system, said method including the steps of inputting a group of connectivity data, interfacing said group of connectivity data to storage of collected connectivity data, building a first data structure in accordance with a first data model, said first data structure including said collected connectivity data and data derived by processing said collected connectivity data, building a second data structure in accordance with a second data model, said second data structure including said data from said first data structure and data derived by processing said data from said first data structure in accordance with pointers from fields of said first data structure to entries in said second data structure, wherein fields of said second data structure include pointers to instances of data included in said first data structure.

15. A method as recited in claim 14, including the further steps of identifying units of said physical system, and sorting said units in accordance with said collected connectivity data.

16. A method as recited in claim 15, including the further steps of identifying connectors corresponding to units of said physical system, and sorting said connectors in accordance with said collected connectivity data.

17. A method as recited in claim 16, including the further steps of grouping said connections to form groups of connections by at least one of said units, said connectors, twisted groups and shields, and sorting said groups of connections by said units and said connectors.

18. A method as recited in claim 17, including the further step of sorting connections in each said group of connections by unit and connector pin.

19. A method as recited in claim 14, including the further steps of partitioning said groups of connections in accordance with a capacity of a drawing sheet, and assigning locations on said drawing sheet to connections of said groups of connections.

20. A method as recited in claim 14, wherein one of said processing steps includes assignment of visual attributes to instances of data in said second data structure.

21. A method as recited in claim 20, wherein said visual attributes include graphic primitives.

22. A method as recited in claim 20, wherein said visual attributes include legends.

23. A method as recited in claim 14, including the further step of accessing data from said first data structure in accordance with said schematic drawing.

24. A method as recited in claim 23, wherein said step of accessing data from said first data structure in accordance with said schematic drawing includes the further step of developing a report of content of said schematic drawing.

25. A method as recited in claim 14, wherein said interfacing step includes parsing a comma delimited file or a report from an application.

26. A method as recited in claim 14, including the further step of interfacing said second data structure to an output tool.

27. A method as recited in claim 14, including the further step of outputting data in said second data structure in an IGES format.

28. A method as recited in claim 14, including the further steps of altering said collected connectivity data in said first data structure in accordance with a design change to form altered collected connectivity data, and propagating alterations in said altered collected connectivity data to said second data structure.

* * * * *